United States Patent [19]

Francis, Jr.

[11] 3,944,934

[45] Mar. 16, 1976

[54] FALSE TRIGGERING PREVENTION CIRCUIT

[75] Inventor: Ralph M. Francis, Jr., Racine, Wis.

[73] Assignee: Milwaukee Resistor Corporation, Milwaukee, Wis.

[22] Filed: Nov. 21, 1974

[21] Appl. No.: 526,059

[52] U.S. Cl. .................................. 328/119; 307/232

[51] Int. Cl.² ............................................ H04B 1/03

[58] Field of Search ........... 307/232, 247, 269, 215; 328/119, 48

[56] References Cited

UNITED STATES PATENTS

| | | | |
|---|---|---|---|
| 2,894,127 | 7/1959 | Stilwell | 328/119 |
| 3,518,555 | 6/1970 | Konotchick | 307/232 |
| 3,575,215 | 4/1971 | Boddy | 328/119 |
| 3,611,158 | 10/1971 | Strathman | 328/119 |
| 3,754,222 | 8/1973 | Eisenberg | 340/258 A |

*Primary Examiner*—Harold A. Dixon
*Attorney, Agent, or Firm*—Mason, Kolehmainen, Rathburn & Wyss

[57] ABSTRACT

A falsing protection circuit for preventing the false triggering of an alarm system or the like by extraneous randomly occurring pulses includes a pulse extractor circuit that is nonresponsive to a predetermined number of initial pulses in a pulse train but responds to subsequent pulses in the train, thereby making the alarm system responsive only to pulse trains containing numerous pulses of the type encountered during actual alarm conditions. Pulse shaping circuitry is included in the pulse extractor circuit for extending all short pulses to a minimum length and for passing all pulses longer than the minimum length at their true length. This effectively prevents a burst of short pulses occurring during the minimum length interval from falsely triggering the system.

11 Claims, 1 Drawing Figure

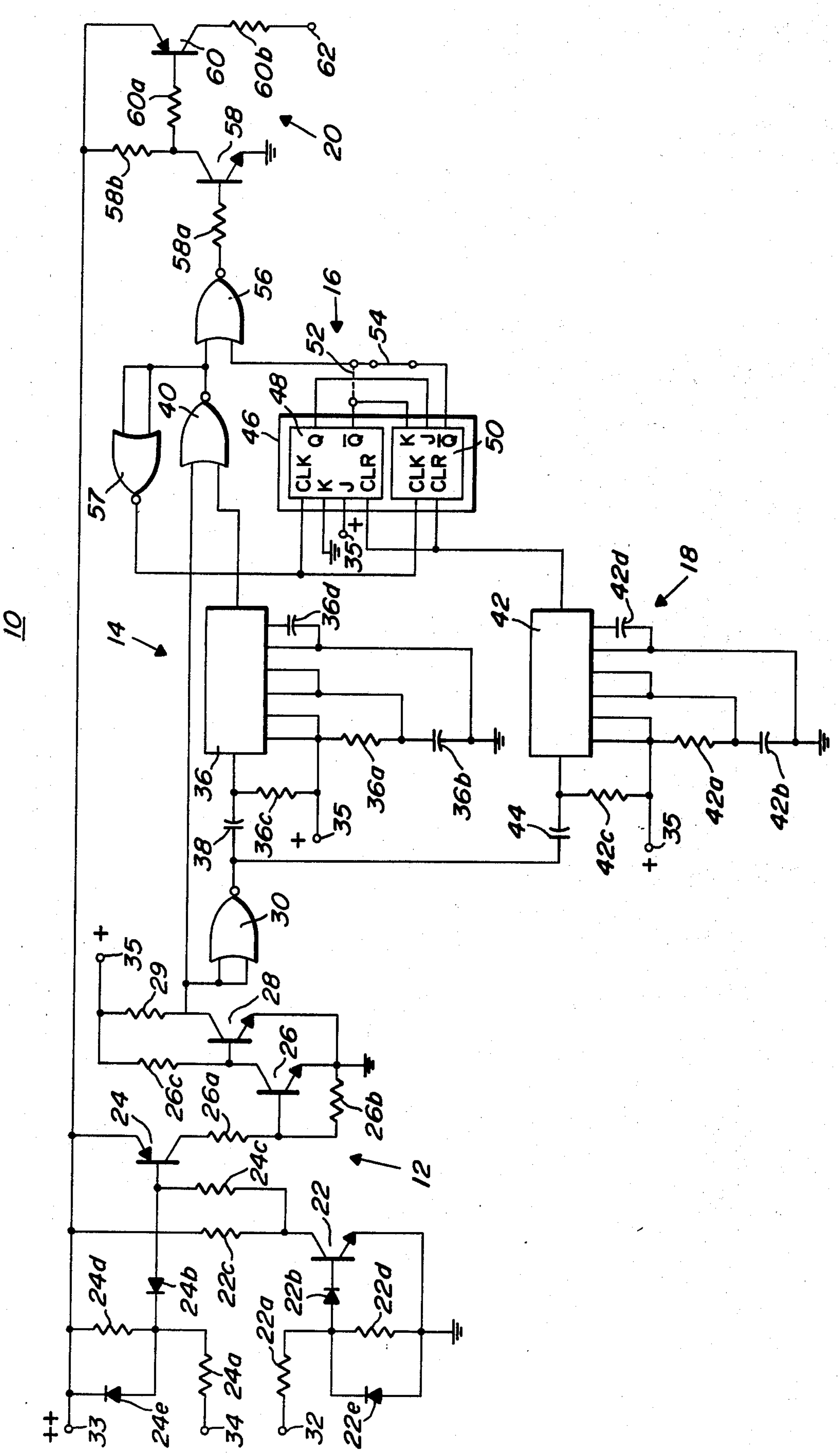
10
12
14
16
18
20
22
22a
22b
22c
22d
22e
24
24a
24b
24c
24d
24e
26
26a
26b
26c
28
29
30
32
33
34
35
36
36a
36b
36c
36d
38
40
42
42a
42b
42c
42d
44
46
48
50
52
54
56
57
58
58a
58b
60
60a
60b
62
CLK
K
J
CLR
Q
Q̄
++
+

FALSE TRIGGERING PREVENTION CIRCUIT

BACKGROUND OF THE INVENTION

This invention relates generally to pulse circuits and more particularly to systems for preventing the false triggering of alarm systems or the like by extraneous signals.

Alarm systems provide alarm signals that have a characteristic frequency within a predetermined range. For example, sonic intrusion devices such as the type described in U.S. Pat. No. 3,754,222 provide periodic signals having a frequency in the range of 3–12 Hertz to indicate human intrusion. Combined with the intrusion signal is extraneous information consisting of low frequency signals caused by environmental changes, and infrequently occurring high frequency bursts of short duration pulses originating from a variety of sources such as atmospheric disturbances, including lightening, and radio interference. Such extraneous signals can cause false triggering of the alarm system; and it is desirable to provide a system that is responsive to the alarm signal, but does not respond to the extraneous signals.

Systems for reducing the probability of falsing (i.e., false triggering) of alarm systems are well known. Various approaches may be taken to reduce the probability of falsing. One such approach is a variable threshold approach wherein the sensitivity of the alarm system is adjusted to a predetermined level in order to make the system responsive only to signals exceeding that predetermined level. The predetermined level may be either manually adjusted or automatically adjusted by means of a feedback loop similar to an automatic gain control circuit. Another approach is to provide timing circuitry that renders the circuit nonresponsive to signals shorter than a predetermined time duration, and a third approach utilizes multiple sensors and differential circuitry for rejecting common mode signals impinging on all the sensors while remaining responsive to localized signals impinging on less than all the sensors.

Whereas these approaches reduce the falsing of alarm systems, the threshold systems necessitate a compromise between sensitivity and falsing performance because if the threshold is set high enough to eliminate most of the falsing, a signal indicating a genuine alarm condition may not be detected. Even automatically adjusted threshold systems have serious drawbacks because the sensitivity is substantially reduced by the feedback loop in noisy environments, and the system remains subject to falsing in a quiet environment where a single high amplitude extraneous pulse may be sufficient to falsely trigger the system.

The time delay systems provide some improvement in performance over the threshold systems, however, they suffer from the disadvantage that a relatively short alarm indicating signal may be missed if its duration is shorter than the time delay of the falsing protection circuit. Common mode rejection is multiple sensor type systems provides no falsing protection to locally confined extraneous signals. Furthermore, a genuine alarm condition applied to all sensors would not trigger the alarm because of the common mode rejection characteristics of the circuit.

SUMMARY OF THE INVENTION

Accordingly, it is an object of the present invention to provide improvements in pulse circuits.

Another object is to provide an improved falsing protection circuit that overcomes disadvantages of prior art systems.

Another object of the present invention is to provide a falsing protection system that significantly reduces the probability of falsing without substantially reducing the system sensitivity.

Another object of the present invention is to provide a relatively simple low cost falsing protection circuit for an alarm system that does not impair the performance of the alarm system.

Yet another object of the present invention is to provide a falsing protection system that is nonresponsive to low frequency signals and infrequently occurring pulse bursts consisting of several rapidly occurring short duration pulses.

In accordance with a preferred embodiment of the invention, the falsing protection circuit comprises a pulse extraction circuit that ignores the first pulse (or any desired number of initial pulses) of each pulse train. In accordance with the invention, the system is nonresponsive to pulses occurring at a slow rate due to the provision of a timing system employed to reset the pulse extractor circuit after a predetermined elapsed time, for example, every 5 seconds. Resetting the system causes the system not to respond to the initial pulse (or pulses) following the reset signal. As a result, the system is nonresponsive to pulses occurring at a rate of less than the desired number of pulses during the timing interval, but remains responsive to signals occurring at a higher rate. As a result, the system is particularly useful when used in conjunction with intrusion detection devices where an intrusion indicative signal comprising periodic signals within a predetermined frequency range, and where extraneous signals caused by environmental changes or other conditions generally comprise slowly varying analog signals or infrequently occurring pulses or pulse bursts.

In addition, a pulse shaping circuit is provided to extend the length of all received pulses that are shorter than a predetermined minimum length to the minimum length. Pulses that have a length longer than the minimum length are passed at their true length. The pulse stretching of short received pulses causes only a single pulse to be provided even if more than one short duration pulse is received during the minimum length interval, for example, every 100 milliseconds. The integration of a short burst of rapidly occurring pulses into a single pulse prevents a multiple pulse burst from falsely triggering the system. Without the pulse shaping circuit, such a false triggering could occur even though the first pulse (or pulses) of the burst is extracted by the pulse extraction system because subsequent pulses of the burst would not be extracted. Furthermore, the pulse shaping circuit provides a reliable triggering signal to the pulse extraction circuit to assure proper triggering of the alarm when the signals received during the minimum length interval are true alarm indicative signals.

The above and other objects and advantages of the present invention will be readily apparent from the following detailed description, taken in conjunction with the accompanying drawing, wherein:

The single FIGURE is a combined block and schematic diagram of a preferred embodiment of the pulse extractor falsing protection system according to the invention.

DETAILED DESCRIPTION OF THE INVENTION

A. General System Description

Referring now to the drawing, the pulse extractor circuit, designated as a whole by the reference numeral 10, comprises an input circuit 12, a pulse shaping circuit 14, an extraction circuit 16, a reset timing circuit 18 and an output circuit 20. The pulse extractor circuit 10 is readily usable with a variety of alarm systems, and may conveniently be inserted, for example, anywhere between the discriminator 28 and the gate circuit 36 of the system described in U.S. Pat. No. 3,754,222 assigned to the same assignee as the assignee of the present invention and incorporated herein by reference.

The input circuit 12 comprises a plurality of transistors 22, 24, 26, 28 and associated circuitry and an inverting amplifier 30. Operating power for the input circuit 12 and the remainder of the extractor circuit 10 is applied to a plurality of power supply terminals designated as 33 and 35 from a conventional dual-voltage power supply (not shown). Input signals are applied to the input circuit 12 at one or both of a pair of input points 32 and 34. The input points 32 and 34 are complementary inputs, the input point 32 being responsive to positive going signals and the input point 34 being responsive to negative going signals.

More specifically, the transistor 22 serves as a conventional common emitter inverting amplifier, and provides an output signal across its collector resistor **22*c* in response to positive going signals applied to its base via the input point 32, a resistor 22*a* and a diode 22*b*. A biasing resistor 22*d* maintains the transistor 22 in a cut off state when no signal is applied to the input point 32, while the diode 22*b* protects the transistor from reverse polarity voltages. A diode 22*e* clamps the input point 32 to a substantially ground potential. When the signals are applied to the input point 32, the diodes 22*b* and 22*e* serve as a voltage doubler to increase the amplitude of the signal applied to the base of the transistor 22**.

The transistor 24 is connected as a common emitter inverting amplifier responsive to negative going signals applied to the base of the transistor 24 from either the input point 34 via the resistor **24*a* and the diode 24*b* or from the collector of the transistor 22 via the resistor 24*c*. As in the case of the transistor 22, a biasing resistor 24*d* is utilized to maintain the transistor 24 in a cut off state in the absence of an input pulse. A diode 24*e* is employed to clamp the input point 34 to positive potential. The function of the diodes 24*b* and 24*e* is similar to that of the diodes 22*b* and 22*e***.

The transistors 26 and 28 form a conventional direct coupled amplifier responsive to pulses applied to the transistor 26 via a coupling resistor **26*a*, with the resistor 26*b* serving as a bias resistor and the resistors 26*c* and 29 serving as collector resistors. Amplifier 30** comprises a NOR gate with its inputs connected together and thus functions as an inverting amplifier.

Signals applied to the input points 32 and 34 (for example, from the discriminator 28 of the patent referred to above) are amplified and limited by the transistors 22, 24, 26, 28 and the amplifier 30 and applied to the pulse shaping circuit 14 and the extraction circuit 16. The shaping circuit 14 serves to extend the length of short pulses to a predetermined minimum length, for example, 100 milliseconds, to the predetermined length and passes longer pulses at their true length. This causes bursts of short rapidly occurring pulses to be integrated into a single pulse and prevents the burst from falsely triggering the system even though the first pulse (or pulses) of the burst have been extracted. Furthermore, the extended pulse provides a more reliable triggering pulse to the extraction circuit 16 to assure proper triggering when the signal received is a true alarm indicative signal.

The shaping circuit 14 includes a pulse extending monostable multivibrator circuit 36 that has an input connected to the output of the amplifier by means of a coupling capacitor 38 and an output connected to one input of a NOR gate 40 within the extraction circuit 16. The output of the transistor 28 is applied to the other input of the NOR gate 40. The output of the inverting amplifier 30 is also applied to a monostable multivibrator 42 in the timing circuit 18 by means of a capacitor 44 and serves to start the timing cycle.

Although various timing circuits may be employed in the pulse shaping circuit 14 and the reset timing circuit 18, it has been found advantageous to use standard integrated circuit multivibrators as the multivibrators 36 and 42. When this is done, the resistor **36*a* and the capacitor 36*b* determine the output pulse width of the multivibrator 36, and the resistor 42*a* and capacitor 42*b* determine the output pulse width of the multivibrator 42. The resistors 36*c* and 42*c* serve as bias resistors for the multivibrators 36 and 42, respectively; while the capacitors 36*d* and 42*d*** serve as transient suppressing capacitors.

The pulse extraction circuit 16 contains a dual flip-flop 46 containing a pair of flip-flops 48 and 50. Any conventional dual flip-flop may be used for the flip-flop 48, and in a preferred embodiment, a 74L73 flip-flop, available from several manufacturers, is used because of its relatively low power drain. The use of a dual flip-flop such as the flip-flop 46 is advantageous because it permits the flip-flops 48 and 50 to be hooked up as a one count counter or a two count counter to permit either one or two pulses to be extracted. In the embodiment shown, one of a pair of jumpers 52 (shown dotted) and 54 (shown solid) may be connected to determine whether one or two pulses, respectively, are extracted.

Both of the flip-flops 48 and 50 are of the type that are triggered on the trailing edge of the clock pulse and provide an output indicative of the data applied to the J and K inputs immediately prior to the triggering. As a result, each of the flip-flops 48 and 50 serves to delay the signal applied to its inputs by one pulse width. If the two flip-flops 48 and 50 are connected in tandem, the input signal is delayed by the width of two clock pulses.

The above-mentioned delay mechanism is utilized to provide the pulse extraction feature. The output of the NOR gate 40 is inverted by a NOR gate 57 connected as an inverter and is applied to the clock inputs of the flip-flops 48 and 50. The delayed output from the flip-flops 48 and 50, determined by the signal applied to the J and K inputs of the flip-flop 48, is applied to a NOR gate 56 together with the signal from the NOR gate 40. The NOR gate 56 operates functionally as a NAND gate and provides an output signal only upon receipt of signals from both the NOR gate 40 and the delayed signal from the flip-flop 46. Consequently, no output is provided by the NOR gate 56 until one (or two pulses depending on the configuration of the jumpers 52 and 54) has been received.

The multivibrator 42 serves to clear the flip-flop 46 to provide a one (or two) pulse extraction after each timing cycle of the monostable multivibrator 42. The output circuit 20 comprises a pair of amplifier transistors 58 and 60. The transistors 58 and 60 receive the signals from the NOR gate 56 and amplify them to a level compatible with the circuitry utilizing the pulse extractor circuit 10 and apply them to an output point 62.

B. System Operation

In order to explain the operation of the pulse extractor 10, a description of the application of a representative pulse train applied to one of the inputs 32 and 34 is set forth below. For purposes of the following discussion, a positive going or high signal shall be considered a 1, and a negative going or low signal shall be considered a 0. However, it should be understood that the above definition is intended only for purposes of illustration, and that the circuit 10 can readily be made to operate with different polarity logic.

If a positive going signal is applied to the input 32 or a negative going signal applied to the input 34, the input signal will be amplified, limited and inverted by the transistors 22, 24, 26 and 28 and result in a 1 appearing at the collector of the transistor 28. The 1 appearing at the collector of the transistor 28 is simultaneously applied to one input of the NOR gate 40 and both inputs of the NOR gate 30. The application of the 1 to both inputs of the NOR gate 30 causes a resetting pulse to be generated and applied to both of the monostable multivibrators 36 and 42. The monostable multivibrator 36 has a relatively short timing cycle (for example, 100 milliseconds) whereas the monostable multivibrator 42 has a relatively long timing cycle (for example 5 seconds nominally). Accordingly, upon receipt of a 0 from the NOR gate 30, the multivibrator 36 provides a 100 millisecond positive pulse to the NOR gate 40 and the multivibrator 42 provides a 5 second duration positive pulse to the flip-flops 48 and 50 to enable the flip-flops 48 and 50 during the 5 second interval.

The NOR gate 40 provides a 0 output to the NOR gates 56 and 57 when a 1 is applied to either one of its inputs. Consequently, the output of the gate 40 is a 0 having a duration equal to the wider of the two 1's applied to its input. As a result, if the duration of the pulse applied to the input circuit 12 is shorter than 100 milliseconds, the output of the gate 40 will be equal to 100 milliseconds, but if the input pulse is longer than 100 milliseconds, the output of the gate 40 will have a duration equal to the width of the input pulse.

The output pulse from the NOR gate 40 is inverted by the NOR gate 57 and applied to the clock inputs of the flip-flops 48 and 50. Upon receipt of the leading edge of the clock pulse, the input signals applied to the J and K inputs of the flip-flops 48 and 50 are clocked into the respective flip-flops, but no change of state takes place at the output. The J input of the flip-flop 48 is connected to a positive potential and the K input is connected to ground potential, thereby resulting in a 1 being clocked into the J input and a 0 being clocked into the K input whenever a clock pulse is received. If the jumper 52 is connected to provide a one pulse delay, then the $\overline{Q}$ output of the flip-flop 48 is applied to the NOR gate 56. This output is normally high, thereby maintaining the output of the NOR gate 56 low and effectively preventing the passage of the first pulse from the gate 40 to the output circuit 20.

After the output signal from the NOR gate 57 goes low, the J and K information previously clocked into the flip-flop 48 is transferred to the Q and $\overline{Q}$ outputs of the flip-flop 48. This causes the $\overline{Q}$ output of the flip-flop 48 to go low and enable the subsequent passage of pulses through the gate 56. Because the J and K inputs of the flip-flop 48 remain unchanged, the subsequent clocking in of J and K information following each pulse from the NOR gate 57 will maintain the $\overline{Q}$ output of the flip-flop 48 at zero. Hence, the NOR gate 56, which provides a 1 output only if both of its inputs are 0, will provide a 1 output for each subsequent pulse applied to one of the inputs 32 and 34 as long as the flip-flop 48 is not cleared.

The clearing of the flip-flops 48 and 50 is accomplished by the timing multivibrator 42. The timing multivibrator 42 provides a 1 to each of the flip-flops 48 and 50 for a 5 second interval following the receipt of an input pulse. The positive signal maintains the flip-flops 48 and 50 operative to load the J and K information into the NOR gate 56 upon receipt of clock pulses from the NOR gate 57. However, at the expiration of the 5 second timing interval, the output of the multivibrator goes low to thereby clear the flip-flops 48 and 50 and to cause the $\overline{Q}$ outputs of each of the flip-flops 48 and 50 to go high. This inhibits the passage of pulses through the NOR gate 56 until another pulse is applied to the input of the multivibrator 42 to initiate a new timing cycle. The initiation of the new timing cycle reenables the flip-flops 48 and 50 and allows the loading of new J and K information into the flip-flops 48 and 50. This permits the $\overline{Q}$ output of the flip-flops 48 and 50 to again go low following the trailing edge of the first pulse received after the reinitiation of the timing interval. As a result, one of the pulses from the input pulse train is extracted every 5 seconds. If more than one pulse is present during a 5 second interval, all of the subsequent pulses other than the first pulse are passed to the output circuit 20. If one or fewer pulses are present, no pulses are passed because the flip-flop 48 is cleared once every 5 seconds and each pulse received is extracted.

If it is desired that two pulses be extracted, the jumper 52 is removed and replaced with the jumper 54. This connects the Q and $\overline{Q}$ outputs of the flip-flop 48 to the J and K inputs, respectively, of the flip-flop 50, and connects the $\overline{Q}$ output of the flip-flop 50 to the input of the NOR gate 56. As a result, th gate enabling signal from the flip-flop 48 is further delayed by a second time interval equivalent to the time interval of the second received pulse prior to being applied to the input of the NOR gate 56. This inhibits the passage of signals by the NOR gate 56 to the output 20 until after two pulses have been extracted.

The operation of the second delay is as follows. Following each resetting pulse from the timing circuit 42, the $\overline{Q}$ outputs of both of the flip-flops 48 and 50 are high. This inhibits the operation of the NOR gate 56. The first pulse in the received pulse train, applied to the clock inputs of the flip-flops 48 and 50 via gate 57, causes the J and K information to be loaded into the flip-flop 48. Following the trailing edge of the first pulse, a 0 appears at the $\overline{Q}$ output of the flip-flop 48 and a 1 appears at the Q output. This results in a 1 being applied to the J input of the flip-flop 50 and a 0 being applied to the K input following the receipt of the first input pulse. This information is loaded into the flip-flop 50 after the second input pulse, which serves as a clock pulse for the flip-flop 50, is received. As in the case of the flip-flop 48, the trailing edge of the second received pulse causes a transition in the $\overline{Q}$ output of the flip-flop 50 to drive the input of the NOR gate 56 low and to permit the passage of subsequent pulses received therethrough. Because the Q and $\overline{Q}$ outputs of the flip-flops 48 do not change state between reset pulses from the monostable multivibrator 42, the J and K inputs to the flip-flop 50 remain constant during the portion of the 5 second timing interval of the multivibrator 42 following the first two received pulses. As a result, the $\overline{Q}$ output of the flip-flop 50 will remain low during this interval. This permits the passage of all pulses following the receipt of the first two input pulses during each 5 second timing interval provided by the monostable multivibrator 42.

The pulses from the NOR gate 56 are amplified in a conventional manner by the transistors 58 and 60 which are connected as a conventional direct coupled complementary pair with the resistors **58*a* and 60*a* serving as coupling resistors and the resistors 58*b* and 60*b* serving as collector resistors. The amplified signals are applied to the output point 62 for application to the alarm circuit employed in conjunction with the pulse extractor circuit 10.**

While certain preferred embodiments of the invention have been described by way of illustration, many modifications will occur to those skilled in the art; it will be understood, of course, that it is not desired that the invention be limited thereto, since modifications may be made, and it is, therefore, contemplated by the appended claims to cover any such modifications as fall within the true scope and spirit of the invention.

What is claimed and desired to be secured by Letters Patent of the United States is:

1. A pulse circuit comprising:
- input circuit means for receiving input pulses;
- output circuit means for providing output pulses;
- pulse extractor means for extracting a predetermined number of initial ones of said input pulses interconnecting said input circuit means and said output circuit means, said pulse extractor means being nonresponsive to said predetermined number of initial ones of said input pulses applied thereto and responsive to input pulses subsequent to said predetermined number of initial ones of said input pulses for rendering said output means operative to provide output pulses in response to input pulses following said initial ones of said input pulses; and
- timing means coupled to said pulse extractor means and to said input circuit means, said timing means being responsive to one of said input pulses for rendering said pulse extractor means operative to extract a number of subsequent input pulses equal in number to said predetermined number upon the elapse of a predetermined time interval following the receipt of said one of said input pulses.

2. A pulse circuit as recited in claim 1 further including pulse shaping means electrically coupled to said input circuit means, said pulse shaping means including means for providing pulses having a fixed duration in response to input pulses having a duration less than said fixed duration, and for providing pulses having a duration equal to the duration of said input pulses in response to input pulses having a duration greater than said fixed duration.

3. A pulse circuit as recited in claim 1 wherein said pulse extractor means includes means responsive to pulses applied to said input means for providing an enabling signal following the receipt of said predetermined number of initial input pulses.

4. A pulse circuit as recited in claim 3 further including gating means responsive to said enabling signal providing means for providing pulses to said output circuit means in response to said input pulses only upon receipt of said enabling signal.

5. A pulse circuit as recited in claim 4 wherein said enabling signal providing means includes a single flip-flop.

6. A pulse circuit as recited in claim 5 wherein said enabling signal providing means includes a second flip-flop connected to said flip-flop.

7. A pulse circuit as recited in claim 3 wherein said timing means includes a timing monostable multivibrator connected to said pulse extractor means for resetting said pulse extractor means to terminate said enabling signal following the elapse of said predetermined time interval.

8. A pulse circuit as recited in claim 7 further including pulse shaping means comprising a pulse shaping monostable multivibrator means for providing fixed duration pulses in response to input pulses, and gating means, said gating means being responsive to said input means for providing an output pulse having a duration equal to the longer of said input pulse and said fixed duration pulse.

9. In an alarm system responsive to a predetermined first condition for providing a first condition indicative signal having a predetermined minimum number of pulses within a predetermined time interval, and to a second condition for providing a second condition indicative signal having fewer than said predetermined number of pulses within said predetermined time interval, said alarm system being responsive to said first and second condition indicative signal for providing an alarm signal, a circuit for rendering said alarm system nonresponsive to said second condition indicative signal, comprising:
- means for receiving said first and second condition indicative signals;
- means for providing a timing signal representative of said predetermined time interval;
- means connected to said receiving means and to said timing signal providing means and responsive thereto for providing a first output signal in response to the receipt of said timing signal and said first condition indicative signal and for providing a second output signal in response to the receipt of said timing signal and said second condition indicative signal, said output signal providing means including counting means responsive to the receipt of said predetermined minimum number of pulses for providing said first output signal; and
- gating means coupled to said output signal providing means and said receiving means, said gating means being responsive to said output signal providing means for passing therethrough those pulses of said first condition indicative signal exceeding said predetermined minimum number of pulses
- wherein said timing signal providing means is coupled to said counting means for resetting said counting means said predetermined time interval following the receipt of one of the pulses of one of said first and second condition indicative signals.

10. A circuit as recited in claim 9 further including pulse shaping means coupled to said receiving means for extending to said predetermined length the length of pulses that are shorter than said predetermined length.

11. A pulse circuit comprising:

input circuit means for receiving input pulses;

output circuit means for providing output pulses;

pulse extractor means interconnecting said input circuit means and said output circuit means, said pulse extractor means being nonresponsive to a number of initial pulses applied thereto and responsive to input pulses subsequent to said predetermined number of initial input pulses for rendering said output means operative to provide output pulses in response to input pulses following said initial input pulses; and pulse shaping means interposed between said input circuit means and said output circuit means, said pulse shaping means including means for providing pulses having a fixed duration in response to input pulses having a duration less than said fixed duration, and for providing pulses having a duration equal to the duration of said input pulses in response to input pulses having a duration greater than said fixed duration.

* * * * *